United States Patent

[11] 3,576,065

[72] Inventor Lorne L. Frazier
 Torrance, Calif.
[21] Appl. No. 830,557
[22] Filed Mar. 24, 1969
[45] Patented Apr. 27, 1971
[73] Assignee Chromalloy American Corporation
 New York, N.Y.
 Continuation-in-part of application Ser. No. 797,951, Feb. 10, 1969, now abandoned.

[54] REPAIR OF APERTURED MACHINE COMPONENTS
 11 Claims, 3 Drawing Figs.
[52] U.S. Cl..................................................... 29/402,
 29/156.8, 29/423, 29/530
[51] Int. Cl..................................................... B22d 19/10,
 B23p 7/04, B23p 17/00
[50] Field of Search........................................ 29/402,
 423; 29/401; 52/514; 29/156.8 (H), 530, 157 (C)

[56] References Cited
 UNITED STATES PATENTS

| | | | |
|---|---|---|---|
| 1,127,041 | 2/1915 | Lloyd .......................... | 29/423 |
| 1,644,157 | 10/1927 | Smith .......................... | 29/157 |
| 2,687,278 | 8/1954 | Smith et al.................. | 416/90 |
| 3,036,369 | 5/1962 | Wilkins ....................... | 29/423X |
| 3,044,153 | 7/1962 | Kent et al. .................. | 29/423X |

Primary Examiner—John F. Campbell
Assistant Examiner—D. C. Reiley
Attorney—White & Haefliger ABSTRACT: Machine parts subject to heating in service, particularly hollow engine nozzle guide vanes apertured for internal cooling, are repaired to close cracks that develop at the aperture locations be inserting into the apertures tubes of siliceous composition, closing the cracks by welding about the inserts, and removing the inserts from the apertures to restore them to normal openness without necessitating expensive machining operations for restoration of the part.

PATENTED APR 27 1971

3,576,065

INVENTOR.
LORNE L. FRAZIER
By White & Haefliger
ATTORNEYS.

3,576,065

REPAIR OF APERTURED MACHINE COMPONENTS

This application is a continuation-in-part of my pending application Ser. No. 797,951 filed Feb. 10, 1969, now abandoned, and assigned to the assignee of this application.

BACKGROUND OF THE INVENTION

The invention is directed to the repair of apertured machine components which in service develop cracks at the aperture locations. Typically the invention is applicable to the repair of aircraft and gas turbine components where complicated hole and passage configurations exist as in hot-section parts such as nozzle guide vanes, combustion chambers, transition ducts and the like. More particularly the invention has important applicability to the repair of air-cooled nozzle guide vanes having cooling holes generally tangential to the vane surface and which are costly to repair by conventional practices.

Such vanes commonly are made of alloys, e.g. cobalt or nickel-based alloys, resistant to service temperatures typically in the order of 1,950 °F. The vanes are of hollow configuration and are internally cooled by the admission of air through a series of holes typically about 0.050 inch in diameter and of high length-to-diameter ratio. In service these vanes may develop cracks emanating from or terminating in the holes. According to conventional practices the vane is repaired by welding at the hole locations with resultant partial or total closure of the apertures and consequent requirement for expensive repair machining to restore the vane to a condition of normal openness.

SUMMARY OF THE INVENTION

The present invention contemplates a novel and improved repair procedure according to which the vane holes displaying cracks initially are closed by inserts which do not consequently affect the vane metal at welding temperatures, and the cracks are closed and the integrity of the vane metal restored by welding about the holes and inserts, following which the inserts are removed from the holes to restore them to normal openness. If required, relatively inexpensive grinding may restore the initial surface smoothness of the vane.

I preferably employ as the hole core or filler a siliceous material having little or limited expansion at the welding temperature and which, as indicated, does not adversely affect the vane metal. The core of filler material is also selected for its solubility and complete removability from the apertures following welding as by dissolution in hot molten caustic soda. Fused quartz has been used successfully for the aperture inserts, although other soluble siliceous materials as of alumina-magnesia-silica compositions may be used. To facilitate removal of the inserts they are preferably of tubular form affording increased surface exposure for solvent removal, or drill-centered guidance when the inserts are removed by drilling.

The various procedures and materials contemplated in practice of the invention will be further understood from the following detailed description of the illustrative embodiment of the invention as applied to nozzle guide vanes, and as shown by the accompanying drawing in which:

DESCRIPTION OF THE PREFERRED EMBODIMENTS

Figure 1:
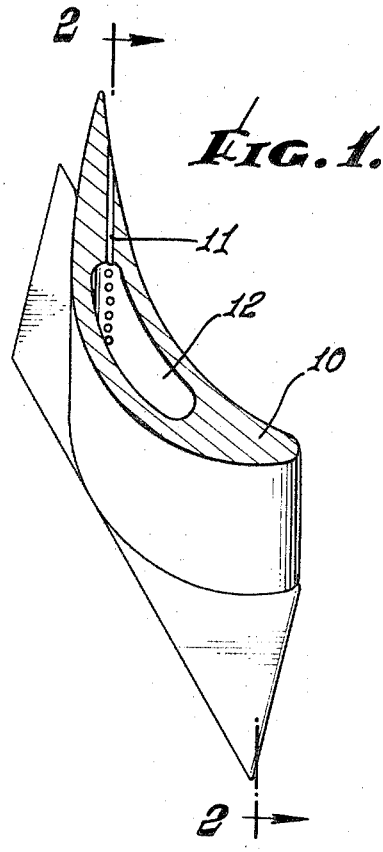
FIG. 1 is a sectional perspective showing of a conventional nozzle guide vane.
Figure 2:
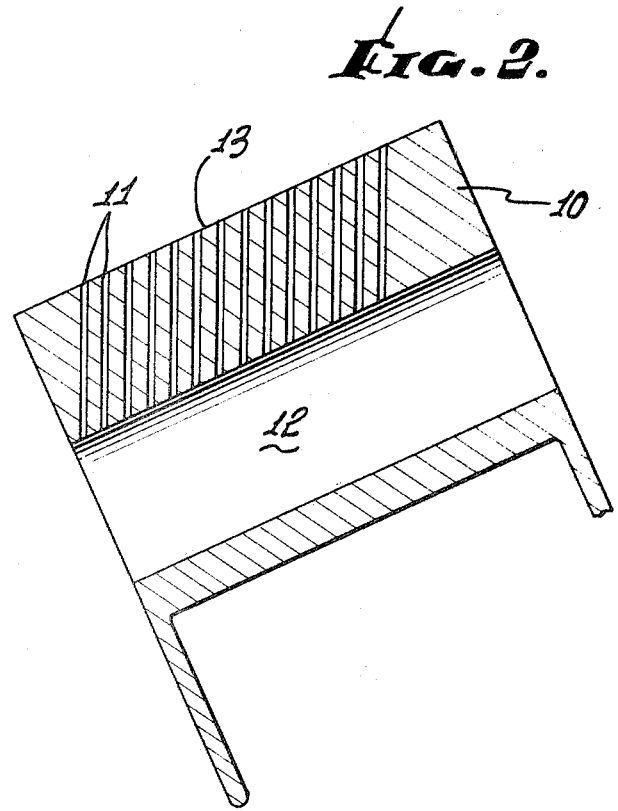
FIG. 2 is a cross section on line 2-2 of FIG. 1.

Conventional jet engine guide vanes having the configuration shown in FIG. 1 have an alloy body 10 which is internally cooled to compensate for high service temperatures by passage of air through a series of holes 11 from the hollow center 12 of the vane. As previously indicated, because of the severity of service conditions the vane may develop cracks appearing in its surface 13 about one or more of the holes 11. Heretofore the practice has been to repair the cracked condition of the vane by welding about the holes, an operation that usually results in partial or total closing of the holes and necessitating time consuming and expensive machining for restoration of the vane to normal openness of the holes.

Figure 3:
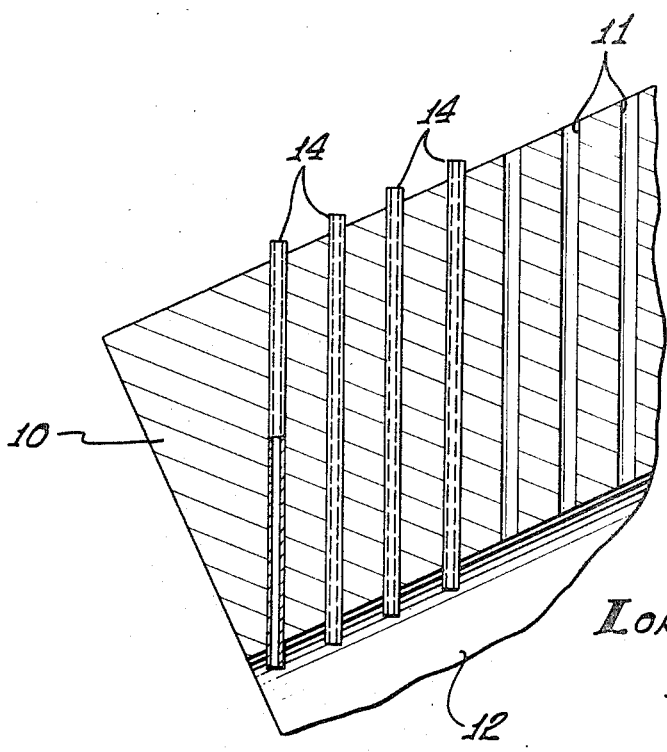
FIG. 3 is a fragmentary enlargement of FIG. 2 showing the cores inserted within the vane apertures.

As illustrated in FIG. 3, the hole openness is preserved by insertion into the holes of cores 14 so composed as not to affect the vane metal at welding temperatures and capable of being removed from the holes following welding. Thus cracks appearing in the vane surface 13 at the hole locations are closed by welding about the projecting ends of the inserts, the latter thus serving as barriers against the entry of the weldment into the holes. The inserts have been found to possess satisfactory strength and solubility when formed of a siliceous composition, typically fused quartz, solubility or drillability of the inserts being favored by the illustrated open tubular form.

For solvent removal of the inserts, following completion of the repair welding the vane is bodily immersed in a solvent capable of dissolving the inserts completely out of the vane holes, for which purpose a molten caustic soda bath at a temperature of around 1,000 °F. is suitable.

The inserts may effectively be removed by drilling through the apertures, using a drill approximating the aperture size. Tubular fused quartz or other brittle siliceous materials are well suited, by reason of their friability, to removal by drilling.

I claim:

1. The method of repairing an apertured hollow metallic machine part subject to heating in use and having a cracked condition at the part aperture, that includes confining a high temperature resistant insert in the aperture, closing the crack by welding about the aperture and insert, and removing the insert from the aperture.

2. The method of claim 1, in which said insert is of siliceous material.

3. The method of claim 1, in which said insert is fused quartz.

4. The method of claim 1 in which said insert is open tubular fused quartz.

5. The method of claim 1 in which said insert is removed by dissolution in molten caustic soda.

6. The method of claim 1 in which said insert is removed by drilling into the aperture.

7. The method of claim 1, in which said part is a hollow nozzle guide vane having a series of small apertures for internal cooling of the vane, said cracked condition being at one or more of the apertures.

8. The method of claim 7, in which the aperture diameter is in the order of about 0.050 inch.

9. The method of claim 7, in which siliceous inserts are confined in selected apertures where cracking occurs.

10. The method of claim 7, in which the insert is tubular fused quartz and is removed by immersion of the vane in hot molten caustic soda.

11. The method of claim 7, in which the insert is tubular fused quartz and is removed by drilling into the aperture.